United States Patent
Tweedie

(10) Patent No.: US 9,225,286 B1
(45) Date of Patent: Dec. 29, 2015

(54) MICRO-INVERTER QUICK MOUNT AND TRUNK CABLE

(71) Applicant: Concise Design, Santa Rosa, CA (US)

(72) Inventor: Richard Tweedie, Santa Rosa, CA (US)

(*) Notice: Subject to any disclaimer, the term of this patent is extended or adjusted under 35 U.S.C. 154(b) by 0 days.

(21) Appl. No.: 14/188,934

(22) Filed: Feb. 25, 2014

Related U.S. Application Data

(60) Provisional application No. 61/769,077, filed on Feb. 25, 2013.

(51) Int. Cl.
*H02S 40/32* (2014.01)
*H02M 1/00* (2007.01)
*H02J 3/00* (2006.01)
*H02M 7/00* (2006.01)
*H02J 3/38* (2006.01)

(52) U.S. Cl.
CPC . *H02S 40/32* (2014.12); *H02J 3/00* (2013.01); *H02J 3/383* (2013.01); *H02M 1/00* (2013.01); *H02M 7/003* (2013.01)

(58) Field of Classification Search
CPC .................................. H02M 1/00; H02J 3/00
See application file for complete search history.

(56) References Cited

U.S. PATENT DOCUMENTS

| | | | | |
|---|---|---|---|---|
| 7,824,191 | B1* | 11/2010 | Browder | 439/76.1 |
| 8,462,518 | B2* | 6/2013 | Marroquin et al. | 361/807 |
| 8,963,378 | B1* | 2/2015 | Fornage et al. | 307/147 |
| 2010/0263704 | A1* | 10/2010 | Fornage et al. | 136/244 |
| 2011/0100425 | A1* | 5/2011 | Osamura et al. | 136/246 |
| 2011/0283272 | A1* | 11/2011 | Angerer et al. | 717/168 |

FOREIGN PATENT DOCUMENTS

WO   WO 2010144637 A1 * 12/2010

* cited by examiner

*Primary Examiner* — Jared Fureman
*Assistant Examiner* — Joel Barnett
(74) *Attorney, Agent, or Firm* — Bay Area Technology Law Group PC

(57) ABSTRACT

A photovoltaic system is disclosed having individual micro-inverters associated with each solar panel. The individual micro-inverters are easily installed without the aid of tools by snap locking a micro-inverter into place upon heat barriers mounted to and separated from the solar panels. When a micro-inverter is snapped into place it automatically electrically engages contacts from the solar panels mounted on the heat barriers. AC trunk cables pass through uni-strut channels along the backs of the solar panels. Flat jumper output cables from the micro-inverters fit adjacent the AC trunk cables within the uni-strut channels where a snap fit electrical connection is made, in a protected environment.

5 Claims, 8 Drawing Sheets

MICRO-INVERTER QUICK MOUNT AND TRUNK CABLE

RELATED APPLICATION DATA

The present application claims priority of U.S. Provisional Patent Application Ser. No. 61/769,077 filed Feb. 25, 2013.

TECHNICAL FIELD

The present invention is directed to photovoltaic solar panels or modules which may be mounted on rooftops, racks or other places where sunlight is available to convert sunlight to electrical power. The output from photovoltaic solar panels is a DC voltage. Inverters convert the DC voltage to AC voltage. The present invention is directed to photovoltaic solar panels where each solar panel is provided with its own micro-inverter.

BACKGROUND OF THE INVENTION

Solar panels produce direct current (DC) which must be converted to alternating current (AC). Typically, useable outputs from solar panel installations are 240 volts AC at 60 Hz for North American installations. In some photovoltaic solar panel installations a single inverter may convert the DC outputs to AC from a string of solar panels.

Using a single inverter for a string of solar panels has some disadvantages. DC cables and attendant diodes are necessary to connect individual solar panels with the inverter. This adds a level of cost, complexity and associated installation labor. There are also inherent dangers. DC strings from solar panels can exceed 600 volts, which cannot be readily shut off.

An alternative approach is to use a single micro-inverter with each solar panel. As the name implies, micro-inverters are small inverters intended to handle the output of a single solar panel. Most are rated at about 260 watts. This enables one to isolate and tune the output of a solar panel. Large transformers for reducing cooling loads aren't needed nor are cooling fans. There is also evidence that overall efficiencies of solar installations are higher with the use of micro-inverters with each solar panel.

With micro-inverters, any solar panel that is under-performing will not have an adverse effect on the panels around it. Micro-inverters produce grid matching power directly at the back of a solar panel. Arrays of solar panels are connected in parallel to each other and then to the grid feed. Thus, a single failing panel or inverter will not take the entire solar panel string offline.

Although there are obvious advantages in employing micro-converters for the conversion of DC to AC emanating from solar panels, such products have experienced issues limiting their longevity. Specifically, it has been found that the high temperatures associated with the photovoltaic panels have resulted in micro-inverter failures. This situation has been somewhat addressed by component selection and the employment of UV glass surface treatment on the panels themselves which reduces heat buildup.

Other problems also exist. Since the solar panels create a warm environment animals such as rodents tend to migrate to these areas. In turn, they can chew or damage solar panel wire conductors. Theft of micro-inverters is also a problem. Finally, replacement of micro-inverters is often difficult and labor intensive.

It is therefore an object of the invention to provide an improved solar panel array utilizing a single micro-inverter for each solar panel.

Another object of the invention is to provide an improved mounting arrangement of a micro-inverter to a solar panel.

Another object of the invention is to mount a micro-inverter so as to be in direct contact with the outputs of a solar panel to thereby eliminate micro-inverter wire leads and diodes.

Still another object of the invention is to provide a system and method of mounting micro-inverters directly to solar panels in a manner that provides easy installation.

Yet another object of the invention is to provide a system whereby micro-inverters that are underperforming or not performing are easily replaced from a solar panel.

Another object of the invention is to mount a micro-inverter to a solar panel to minimize exposure of heat created by the solar panel.

Another object of the invention is to provide a method and structure to easily connect and disconnect the micro-inverter output cable to an AC trunk cable connected to a plurality of micro-inverters.

These and further objects will be readily apparent when considering the following disclosure and appended claims.

SUMMARY OF THE INVENTION

A solar photovoltaic system and method comprises a plurality of photovoltaic solar panels providing DC outputs, where each panel has an enclosure which encloses photovoltaic cells. Ribbon conductors conduct DC current from each of the photovoltaic cells. A heat barrier made of an insulating material is attached to the back of each solar panel. The ribbon conductors pass through the heat barriers and form exposed rigid contacts on insulator tabs formed in the heat barrier. A micro-inverter for converting the DC voltage from the ribbon conductors to AC voltage is releasably attached to each solar panel. Each micro-inverter directly engages and encloses the rigid contacts when the micro-inverter is releasably attached to the heat barrier. An O-ring seal in the heat barrier surround and seals the contacts.

A single AC trunk cable electrically connects all of the micro-inverter modules in the system or string. The AC trunk cable may be a flat cable with conductors. Each micro-inverter includes a flat jumper output cable with a corresponding number of conductors as the AC trunk cable. When a micro-inverter is installed, the jumper output cable is easily connected into the AC trunk cable.

In one embodiment, the flat jumper output cable has a distal end, where the distal end is enclosed in a molded housing. Piercing elements are formed within the molded housing. One set extends inwardly of the molded housing to electrically engage the jumper cable conductors. Other piercing elements extend outwardly of the molded housing. A snap-in housing or trough is provided to route the flat AC trunk cable. The molded housing of a flat jumper output cable to be attached is placed adjacent to the AC cable in the snap-in housing and the outwardly extending piercing elements engage and pierce the conductors of the AC trunk cable. This piercing action is facilitated by providing that the molded housing snap fits into the trough whereby the piercing elements are driven into the conductors of the AC trunk cable. An alignment mechanism insures proper registration of the output jumper cable conductors and the AC trunk cable conductors.

In accordance with another aspect of the invention, a method of releasably attaching individual micro-inverters to each of a plurality of photovoltaic solar panels is described.

The method includes the steps of attaching individual micro-inverters to each of a plurality of photovoltaic solar panels, each solar panel including photovoltaic cells, a back sheet, conductors attached to the photovoltaic cells and extending from the photovoltaic panel to conduct a DC voltage from the photovoltaic cells through a micro-inverter and a housing, including the steps of: forming rigid terminals on the heat barrier; passing the conductors through the heat barrier and forming contacts on the rigid terminals; attaching and connecting a single AC trunk cable between the individual micro-inverter modules; releasably attaching the micro-inverter housing to the heat barrier; and directly electrically engaging the micro-inverter with the contacts.

The method additionally includes the step of electrically connecting the outputs of each of the micro-inverters of the plurality of solar panels to a single AC trunk cable. Each micro-inverter has a jumper output cable, and the method includes the step of connecting each jumper output cable into the AC trunk line.

The method additionally includes the steps of releasably removing a micro-inverter if it fails to perform properly and replacing it with a new micro-inverter, disconnecting the jumper output cable from the AC trunk line, and releasably detaching the micro-inverter housing from the capture plate and attaching a new micro-inverter when necessary.

DETAILED DESCRIPTION OF THE INVENTION

Figure 1A:
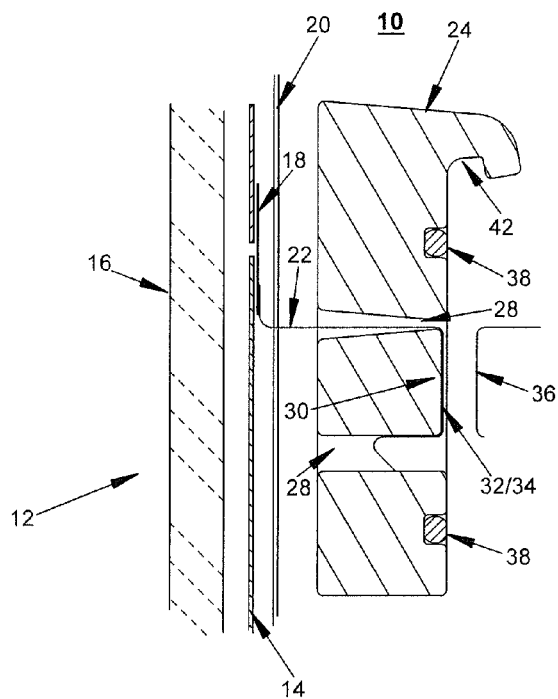
FIG. 1A is an exploded sectional view of a component of the solar panel rigid contact mount to a micro-inverter.

Novel features which are characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration description only and are not intended as definitions of the limits of the invention. The various features of novelty which characterize the invention are recited with particularity in the claims.

There has been broadly outlined more important features of the invention in the summary above and in order that the detailed description which follows may be better understood, and in order that the present contribution to the art may be appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important therefore, that claims be regarded as including such equivalent constructions insofar as they do not depart from the spirit and scope of the present invention.

Certain terminology and the derivations thereof may be used in the following description for convenience and reference only, and will not be limiting. For example, words such as "upward," "downward," "left," and "right" refer to directions in the drawings to which reference is made unless otherwise stated. Similar words such as "inward" and "outward" refer to directions toward and away from, respectively, the geometric center of a device or area and designated parts thereof. Reference in the singular tense include the plural and vice versa, unless otherwise noted.

FIG. 1A is an exploded sectional of the solar panel rigid contact mount 10 of the present invention. (See also FIG. 1B) A solar panel or module 12 includes a tempered glass 16 having an outer surface coated with a thin UV layer to reduce heat in the photovoltaic cell. A conductor 18 electrically connects individual cells which typically form photovoltaic cell 14. Solar panel 12 includes an insulated back sheet or wall 20. Flat ribbon DC conductors 22, connected to conductor 18, pass through back wall 20. Mounted to the back wall 20 of solar panel 12 by any suitable adhesive is a heat barrier 24, also an electrical insulator, which spaces a micro-inverter housing 26 (FIG. 1B) from the solar panel 12. Heat barrier 24 can be a molded structural foam panel or other panel which has heat and electrical insulating properties. Solar panel 12 can be a standard solar panel which are readily available. One such solar panel is made by SunTech. Similarly, micro-inverters are standard items which are readily available. One such micro-inverter is sold by EnPhase.

Figure 1B:
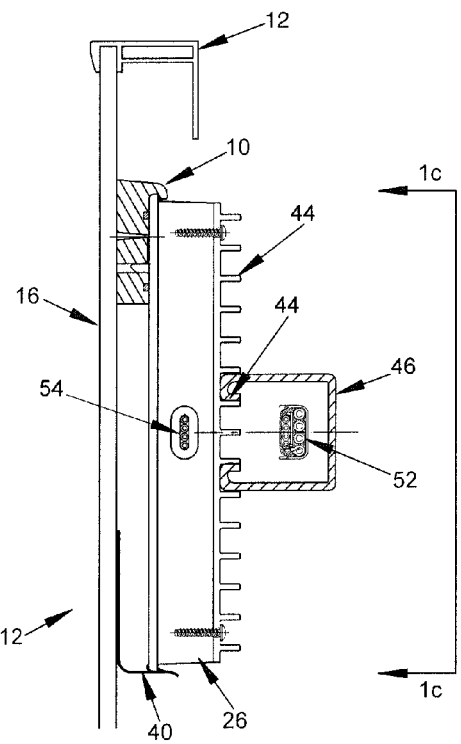
FIG. 1B is a sectional view illustrating the micro-inverter quick mount feature.
Figure 1C:
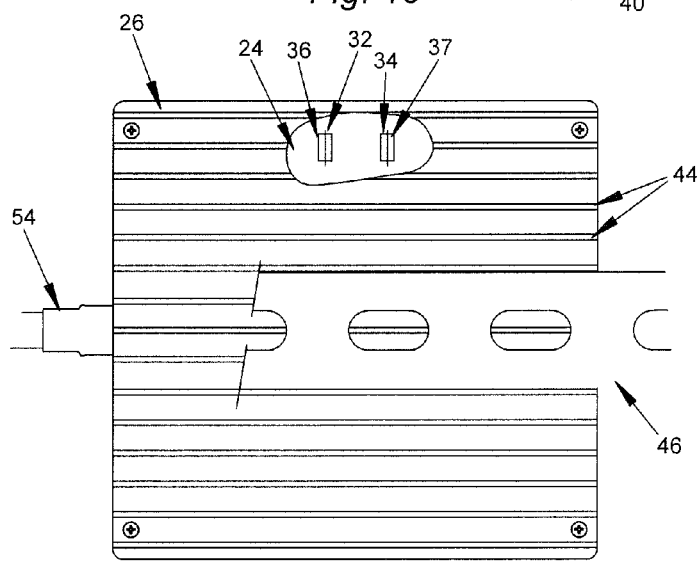
FIG. 1C is a view of the micro-inverter housing as indicated by the view lines in FIG. 1B, with a partial tunnel view.

Two flat ribbon DC conductors 22, one positive and one negative, are fed through slots or orifices 28 in the heat barrier 24. By wrapping the distal ends of the ribbon conductors around the heat barrier tabs or projections 30 in the heat barrier, rigid, fixed contacts are formed, one for the positive contact 32 and one for the negative contact 34 (FIG. 1C). This creates a direct electrical connections with exposed mating ribbon contacts 36 and 37 (FIG. 1C) on the micro-inverter housing 26 designed to receive the solar panel 12 DC output. Sealing is provided by an elliptical O-ring 38 surrounding the contacts 32 and 34.

The micro-inverter is designed to be quickly mounted to the heat barrier 24. Referring additionally to FIG. 1B, a snap latch 40 is mounted to the back wall 20 of solar panel 12 by any suitable adhesive. To releasably attach the micro-converter housing 26 to the solar panel 12 the top of the inverter 26 is inserted into a hook 42 created in the heat barrier 24 (FIG. 1A) and then the bottom is pushed downwardly to engage the snap latch, for quick engagement and removal of the micro-inverter housing 26. When engaged the mating contacts 36 and 37 of the micro-inverter are aligned with and in electrical contact with fixed DC terminals 32 and 34 to receive the DC output from solar panel 12.

Micro-inverter housing 26 is provided with optional cooling fins 44, which may be made from an aluminum extrusion. Cooling fins 44 can engage support rail 46 with an interference fit for direct conductive cooling. As will be described in greater detail later, each micro-inverter has an AC jumper or output cable 54 which is connected into an AC trunk cable 50

(FIG. 2) inside of cable connecter 52, which in turn is located inside of the uni-strut support rail 46. With the micro-inverter 26 captured by the open side of support rail 46, theft of the micro-inverter is discouraged.

FIG. 1C is a view of the micro-inverter housing 26 as indicated by the view lines shown in FIG. 1B with DC contacts 32 and 34 on the heat barrier shown through a tunnel view in housing 26.

Figure 2:
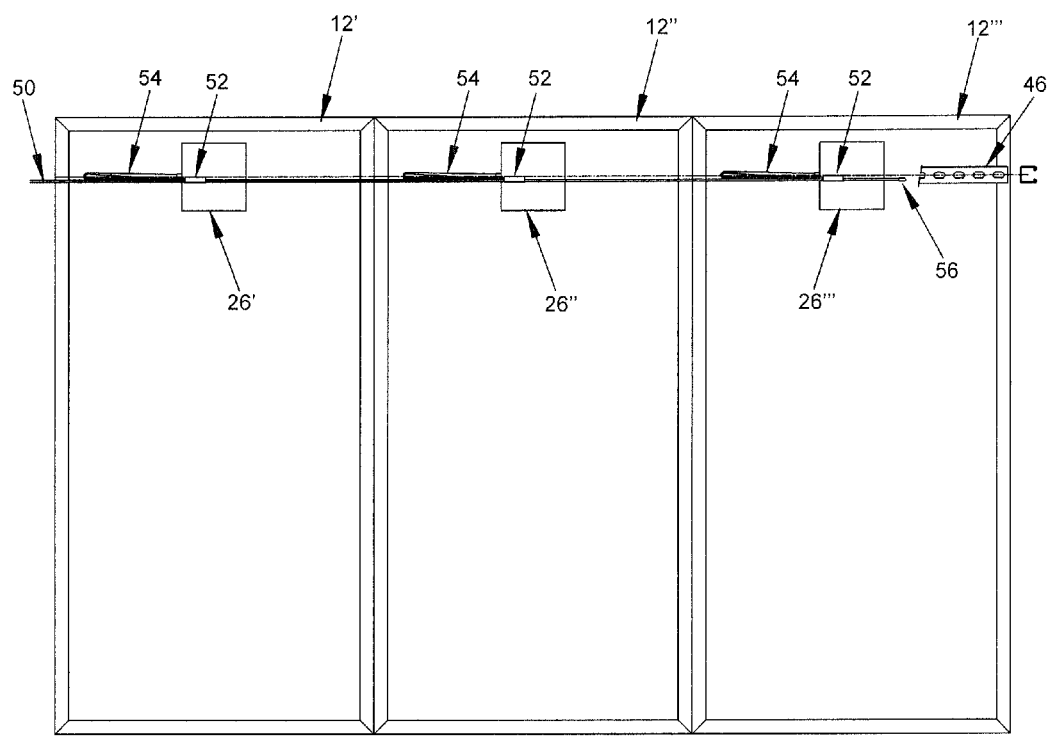
FIG. 2 is an underside view of an array of three solar panels and micro-inverters according to the invention.

FIG. 2 is a view of an array or module of three photovoltaic solar cells 12', 12" and 12'". Micro-inverters 26', 26" and 26'" are attached directly to the back or underside of solar modules 12', 12" and 12'", respectively. The AC trunk cable 50 passes through the support rail 46 mounted to each of the micro-inverters. Each of the micro-inverter AC output jumper cables 54 are shown exiting the micro-inverters on the left as shown in FIG. 2. But they may exit from the right if desired. The jumper cables are spliced within connectors 52 in a manner which will be described in greater detail subsequently. Note that the jumper cables can be connected anywhere along the trunk cables and are not restricted to particular locations. Also shown is a sealed cap 56 closing the trunk cable at the end of the panel array. Of course the number of solar panels in a string is not limited to three, but can be up to 17 or more.

Figure 3:
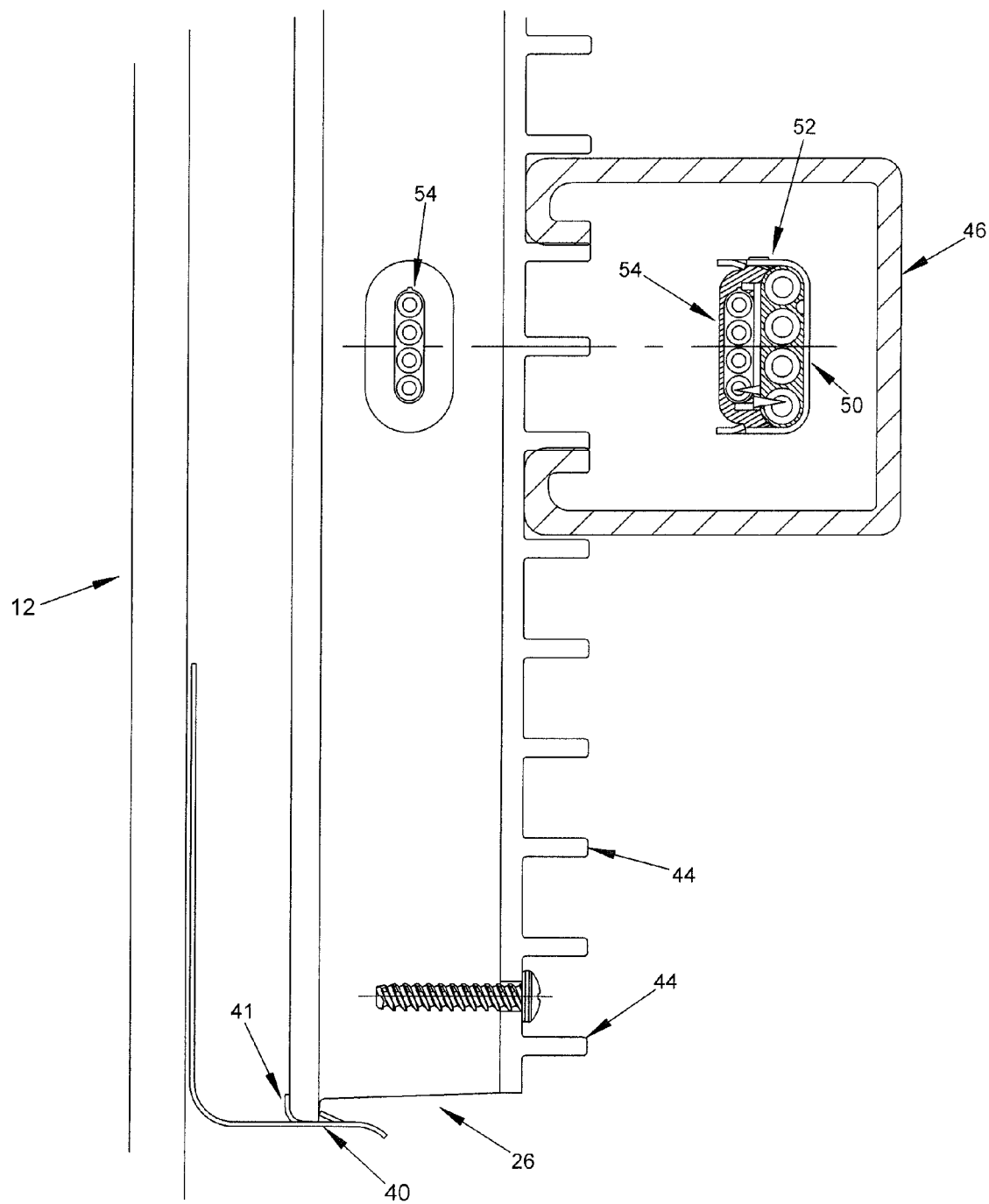
FIG. 3 is an enlarged view of FIG. 1B.

FIG. 3 is an enlarged edge view of FIG. 1b, better showing the placement of the micro-inverter 26 placement on the uni-strut 46 section and lower attachment including spring latch 40 with fixed stop 41. Placement of the jumper cable is centered directly over the uni-strut for easy concealment to protect the cables from rodents and weather exposure. Also shown are the optional cooling fins 44 on micro-inverter 26 housing which capture the support rail providing added support and theft deterrence.

Figure 4:
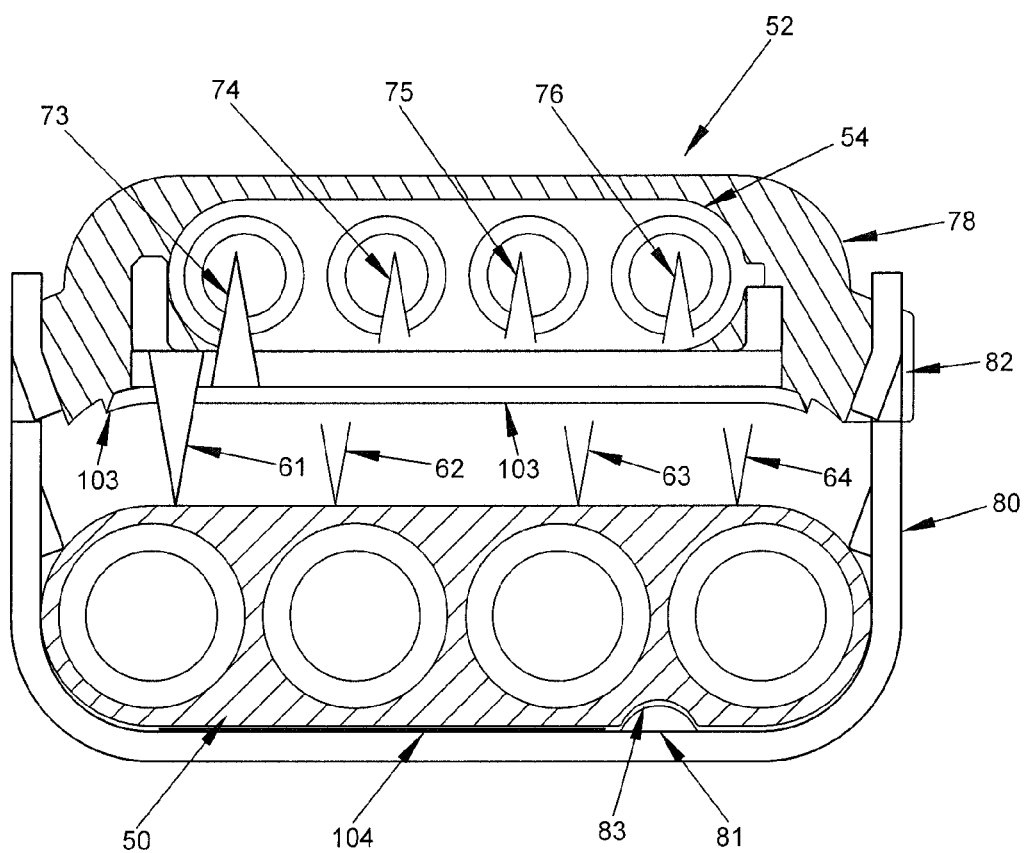
FIG. 4 is a sectional view of the connector for the AC trunk line and micro-inverter output jumper cable prior to the "snap together" assembly.

FIG. 4 is a section view of connector 52 prior to the "snap together" assembly. In the embodiment described, AC flat trunk cable and the AC output jumper cables are shown with four conductors each. But it should be understood that the invention may be used with 3, 5, 6 or more conductors. Four sets of teeth-like piercing elements 61, 62, 63 and 64 are shown poised to engage the 12 gauge, four conductor (12/4) flat trunk cable 50 and create a fixed contact. At opposite end of piercing elements 61-64 formed on contacts 66, 68, 70 and 72 (See FIG. 7) are perpendicular piercing elements 73, 74, 75 and 76 which engage the wire strands of the individual conductors of the micro-inverter output jumper cable 54. Each of the four separate sets of piercing teeth are shown in exact alignment with each other in this view, so that only the longitudinal side of the first sets of teeth are visible. The piercing elements 61-64 are embedded in an insert molded housing 78 at the distal end of the output jumper cable 54 which "snaps-in" to a snap-in cover 80. The sharp hard plastic sealing ridge 103 engages the soft outer jacket of the trunk cable to provide a water tight seal. Keying feature 81 is provided at the interior bottom of the snap-in cover 80 which registers with a corresponding indent 83 in the trunk cable 50, to prevent improper assembly.

Figure 8:
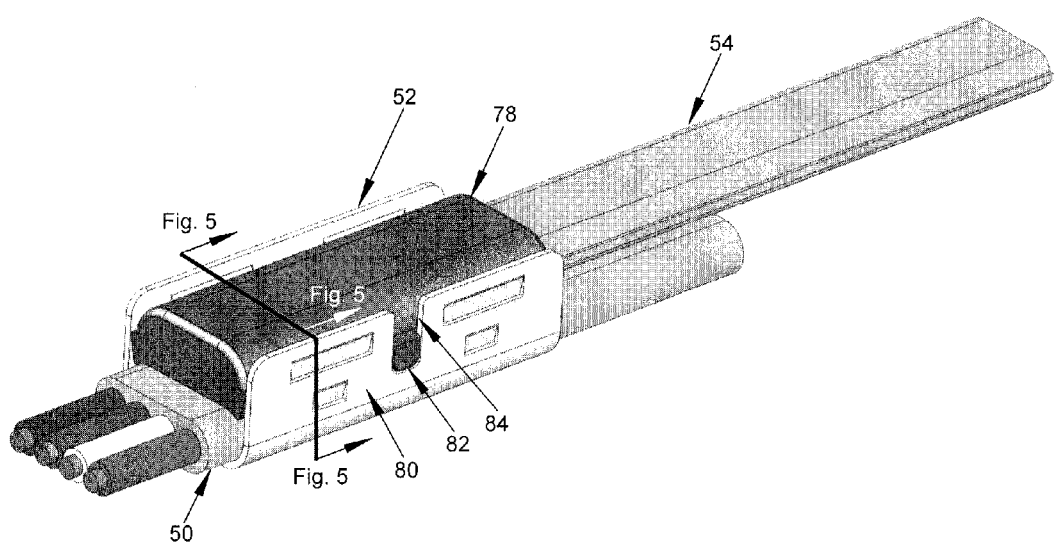
FIG. 8 is a perspective view of the snap-in connector 52 showing the insert molding housing for plug-in cable housing in a closed position.

Referring additionally to FIG. 8 a protrusion 82 in jumper cable molded housing 78 registers with a slot 84 in snap-in cover 80 as keying features that prevent improper assembly. At the bottom of the snap-in cover 80 a double backed tape is attached to maintain the exact relationship and location with trunk cable 50 in order to allow reinsertion of a jumper cable. A screwdriver can be used to disconnect a locking shoulder at interior left or right side of snap cover 80.

Figure 5:
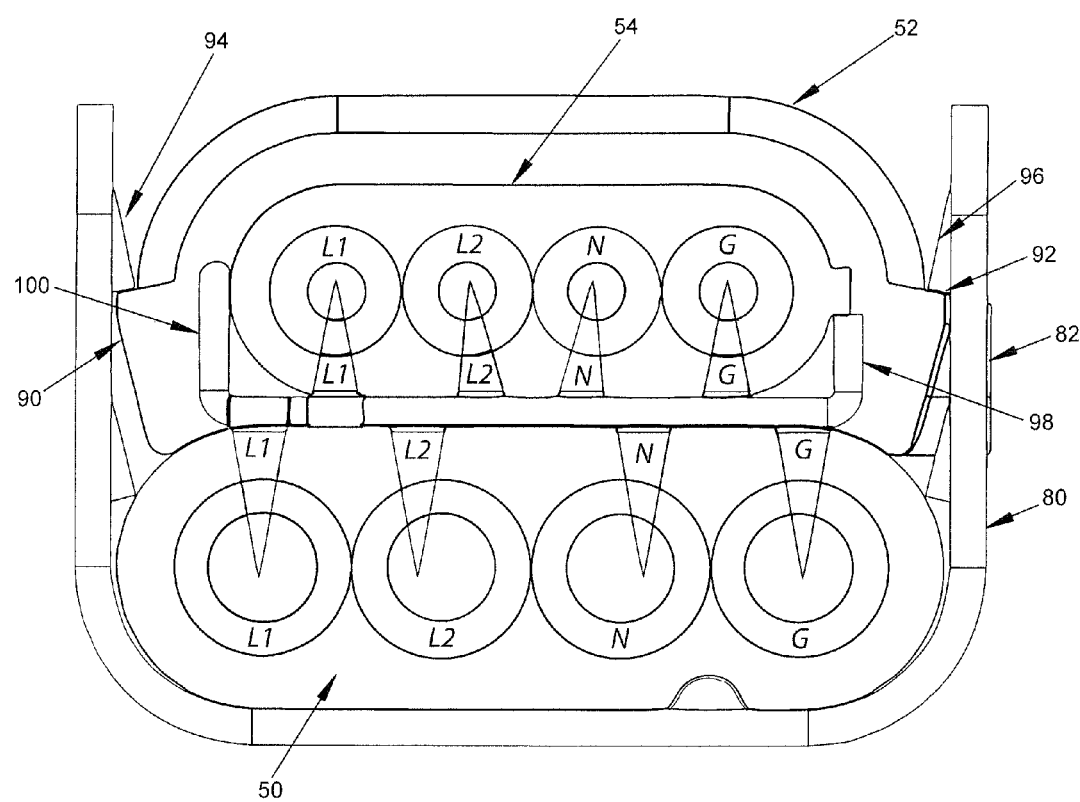
FIG. 5 is a sectional view, taken along a plane indicated in FIG. 8 of the AC trunk line and micro-inverter output jumper in a 'snapped together" connection.

FIG. 5 is a sectional view, taken along the plane indicated in FIG. 8, through the AC trunk cable connector 52 of the micro-inverter plug-in cable connector 52 with the insert molded housing 78 in a closed, "snapped together" position with snap-in housing 80 showing the teeth-like piercing elements as they engage the four wires of the four conductor, twelve gauge (12/4) trunk cable 50 conductors L1 (black), L2 (red), Neutral (white) and Ground (green). Specifically, the four separate contacts are shown in exact alignment with each other in this view, so that only the longitudinal side of the first contact is visible. Also visible is one pair of perpendicular opposing piercing elements for each of the contact plates. Every contact plate has a total of four piercing elements, two facing up and two facing down, as shown in FIGS. 6 and 7.

Locking shoulders 90 and 92 formed in the molded housing are engaged by detents 94 and 96 of the snap-on housing 80. This secures placement of the jumper cable 54 in the snap-in housing 80.

Figure 6:
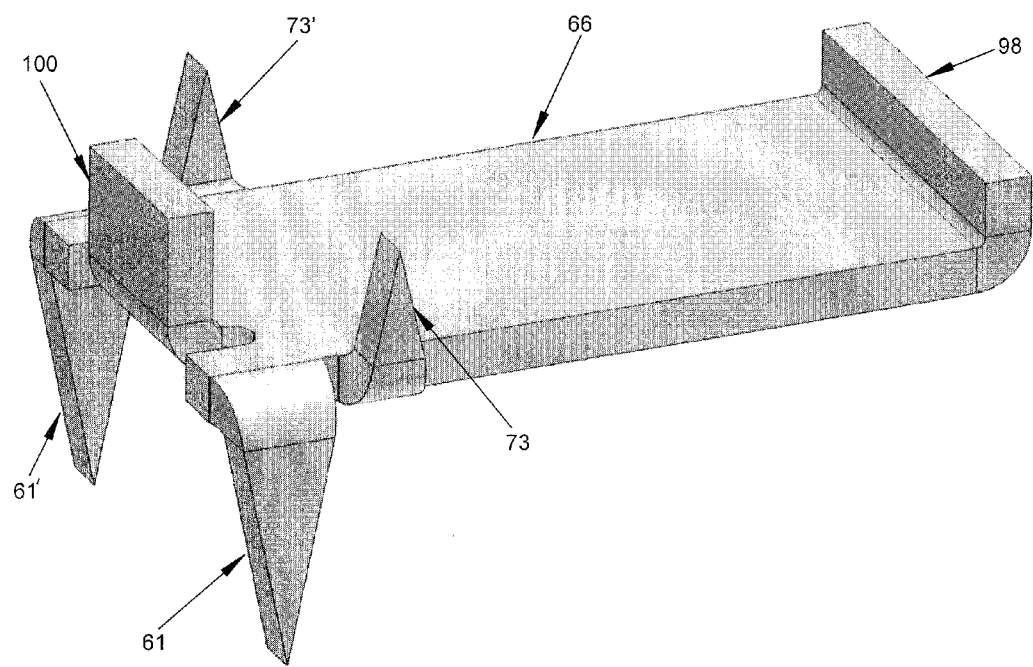
FIG. 6 is a perspective view of one of the contact plates having teeth-like piercing element.

FIG. 6 is a perspective view of one of the contact plates 66 with four teeth-like piercing elements 61, 73, 61' and 73' as they protrude from the sides of the plate. Referring additionally to FIG. 5, two alignment tabs 98 and 100 are provided which are formed at right angles, with the shorter supporting the keying feature 102 on the 18/4 flat jumper cable 54. Pairs of piercing elements 61 and 61' and 73 and 73' extend in identical perpendicular alignment from the contact plate 66. This provides dual piercing into the same conductor for improved electrical reliability.

Figure 7:
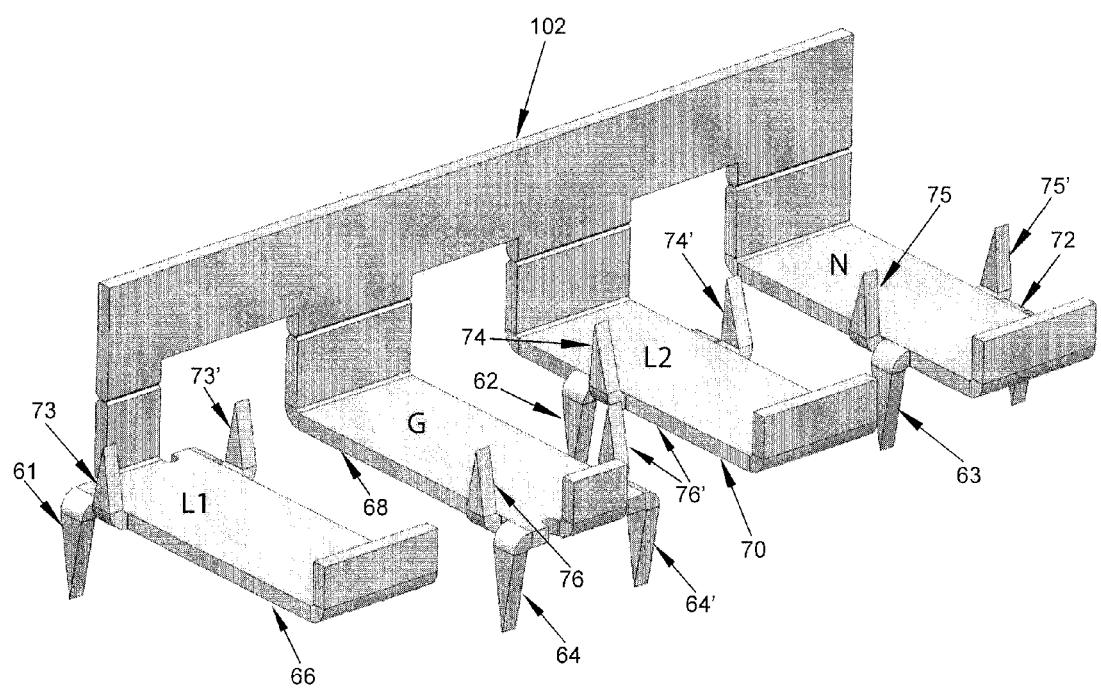
FIG. 7 is a perspective view showing all four contact plates with four perpendicular teeth-like elements protruding from the contact plates.

FIG. 7 is a perspective view showing all four contact plates 66, 68, 70 and 72 each with the four perpendicular teeth-like piercing elements protruding from the plate. The orientation of the jumper cable and trunk cable may be seen by reference to FIG. 5. This view shows the spacing of the plates with their corresponding piercing elements within each of the connectors. As explained the piercing elements used to engage the conductors of the micro-inverter jumper cable 54 are set in an insert mold to create the housing mold 78. During fabrication a breakaway carrier strip 102 is used to load the piercing elements into the insert mold. The strip is broken off after loading leaving the protruding perpendicular edge.

Contact plate 66 with corresponding piercing elements engages the L1 wire.

Contact plate 68 with corresponding piercing elements engages the ground wire G. Contact plate 70 with corresponding piercing element engages the L2 wire in FIG. 5. Contact plate 72 with corresponding piercing elements engages the neutral wire N FIG. 8 is a perspective view of the snap-in connector 52, showing the insert molded housing 78 for plug-in cable housing 80 showing a closed position, fixed contacts with piercing elements in a place, and with a 2" length dimension. Shown are the trunk cable 50 and jumper cable 54 as they protrude from the housing.

The above disclosure is sufficient to enable one of ordinary skill in the art to practice the invention, and provides the best mode of practicing the invention presently contemplated by the inventor. While there is provided herein a full and complete disclosure of the preferred embodiments of the invention, it is not desired to limit the invention to the exact construction, dimensions, relationships, or operations as described. Various modifications, alternative constructions, changes and equivalents will readily occur to those skilled in the art and may be employed as suitable without departing from the true spirit and scope of the invention. Such changes might involve alternative materials, components, structural arrangements, sizes, shapes, forms, functions, operational features or the like. Therefore, the above description and illustration should not be considered as limiting the scope of the invention, which is defined by the appended claims.

What is claimed is:

1. A photovoltaic solar system comprising:
   a plurality of photovoltaic solar panels each composed of individual photovoltaic cells which provide a DC voltage output in response to impingement of solar energy thereon, each solar panel comprising:
   a front face and rear face, said front face facing toward a source of solar energy and said rear face being in contact with and supporting an electrically insulating backing sheet;
   positive and negative ribbon conductors for electrically connecting said individual photovoltaic cells and for conducting DC current therefrom, said positive and negative ribbon conductors passing through openings in said electrically insulating backing sheet;
   a rigid contact mounting device affixed to said electrically insulating backing sheet, said rigid contact mounting device comprising a heat barrier body and a hook configured at one end thereof, said hook being sized and positioned to releasably engage and secure a first edge of a micro-inverter and having tabs positioned to electrically contact said positive and negative ribbon conductors when a micro-inverter is releasably received and supported by said rigid contact mounting device;
   a snap latch affixed to said electrically insulating backing sheet spaced from said rigid contact mounting device and configured to releasably engage and secure a second edge of a micro-inverter;
   a micro-inverter for each photovoltaic solar panel, each micro-inverter for converting DC voltage emanating from said positive and negative DC ribbon conductors to AC voltage, each micro-inverter having first and second edges and sized to be releasably attached to said solar panel by inserting a first edge of said micro-inverter into the hook in said rigid contact mounting device and pushing downwardly upon said micro-inverter to capture said second edge of said micro-inverter by said snap latch whereby said positive and negative ribbon conductors engage said tabs.

2. The photovoltaic solar system of claim 1 wherein each of said micro-inverters comprises a bottom surface and a top surface such that when said micro-inverters are attached to said solar panels, said bottom surfaces are in contact with said rigid contact mounting devices and further comprising a uni-strut support rail positioned to contact said top surfaces of said micro-inverters, said unit-strut support rail being sized to receive an AC trunk cable for connecting individual adjacent solar panels within the plurality of photovoltaic solar panels.

3. The photovoltaic solar system of claim 2 wherein said top surfaces of said micro-inverters comprise cooling fins, said uni-struct support rails being configured to fit between and be supported by said cooling fins.

4. The photovoltaic solar system of claim 2 further comprising AC output jumper cables emanating from each of said micro-inverters which are aligned with, and electrically connectable with, an AC trunk cable within the uni-strut support rail.

5. A method of releasably attaching individual micro-inverters to each of a plurality of photovoltaic solar panels, said method comprising:
   providing a plurality of photovoltaic solar panels each composed of individual photovoltaic cells which provide a DC voltage output in response to impingement of solar energy thereon, each solar panel comprising:
   a front face and rear face, said front face facing toward a source of solar energy and said rear face being in contact with and supporting an electrically insulating backing sheet;
   providing positive and negative ribbon conductors for electrically connecting said individual photovoltaic cells and for conducting DC current therefrom, said positive and negative ribbon conductors passing through openings in said electrically insulating backing sheet;
   providing a rigid contact mounting device affixed to said electrically insulating backing sheet, said rigid contact mounting device comprising a heat barrier body and a hook configured at one end thereof, said hook being sized and positioned to releasably engage and secure a first edge of a micro-inverter and having tabs positioned to electrically contact said positive and negative ribbon conductors when a micro-inverter is releasably received and supported by said rigid contact mounting device;
   providing a snap latch affixed to said electrically insulating backing sheet spaced from said rigid contact mounting device and configured to releasably engage and secure a second edge of a micro-inverter;
   providing a micro-inverter for each photovoltaic solar panel, each micro-inverter for converting DC voltage emanating from said positive and negative DC ribbon conductors to AC voltage, each micro-inverter having first and second edges and sized to be releasably attached to said solar panel; and
   inserting a first edge of said micro-inverter into the hook in said rigid contact mounting device and pushing downwardly upon said micro-inverter to capture said second edge of said micro-inverter by said snap latch whereby said positive and negative ribbon conductors engage said tabs.

* * * * *